Sept. 11, 1956     C. ADAMS, JR     2,762,592
PIPE HANGER
Filed June 10, 1952     3 Sheets-Sheet 1
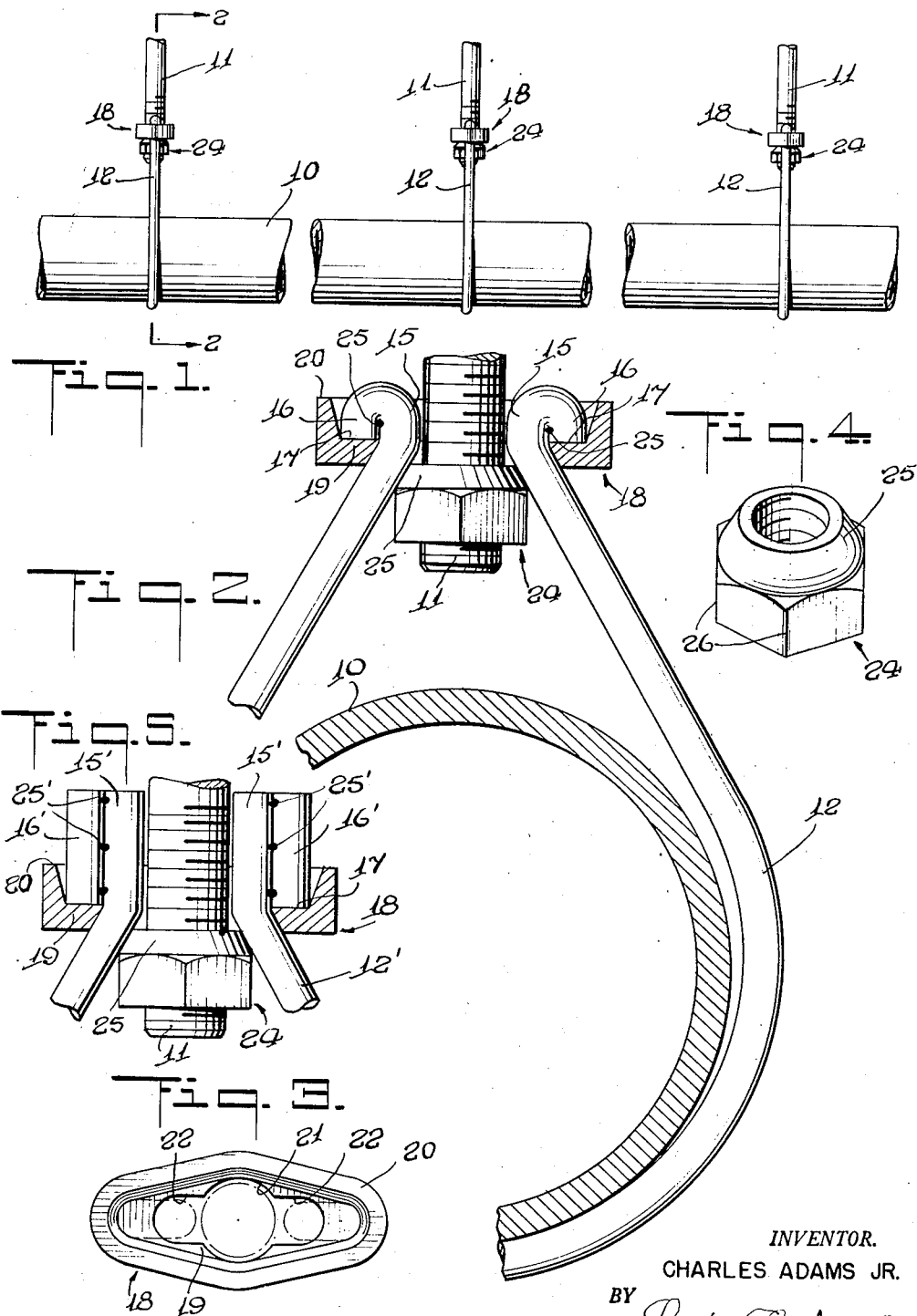
INVENTOR.
CHARLES ADAMS JR.
BY
his ATTORNEY

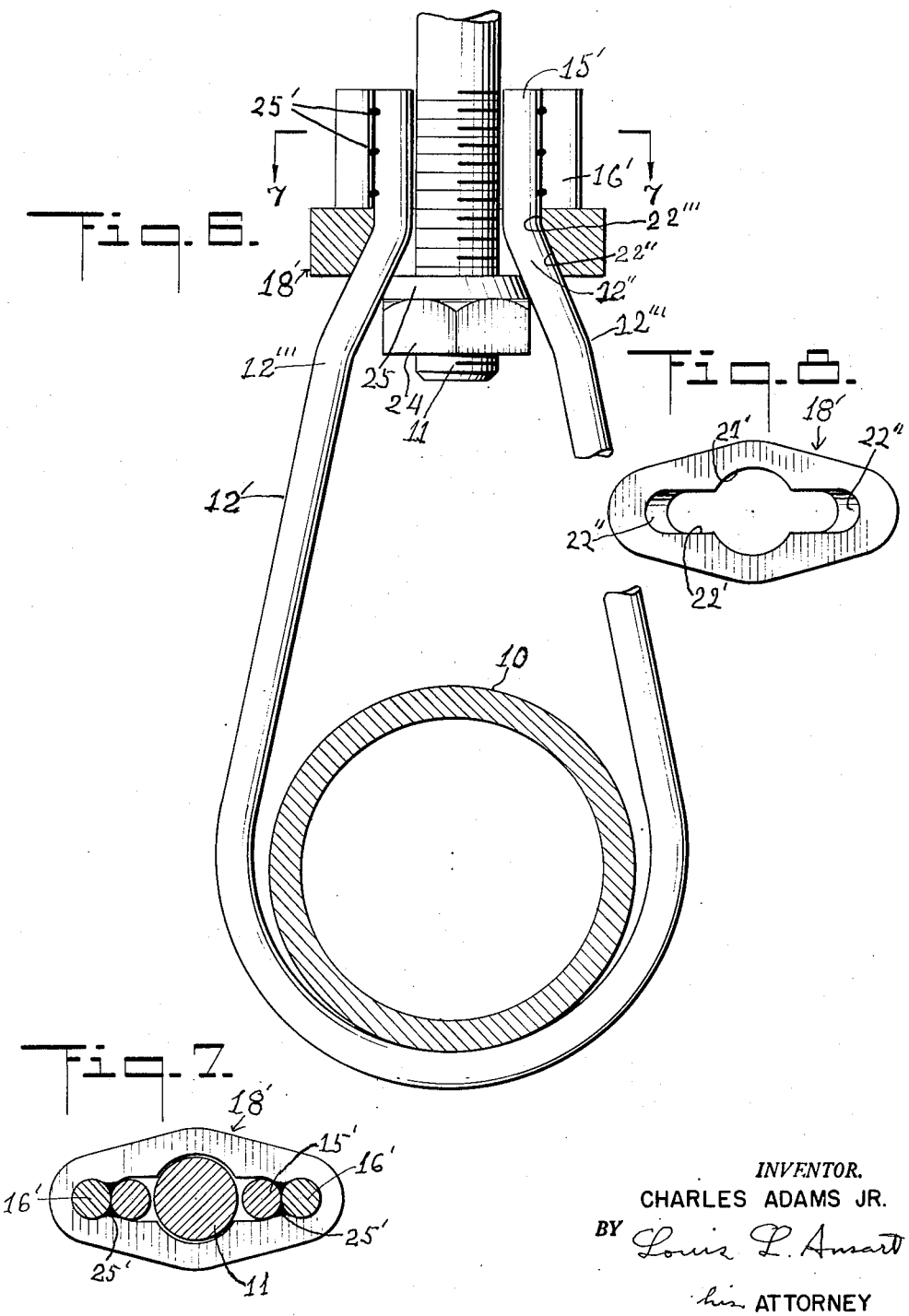

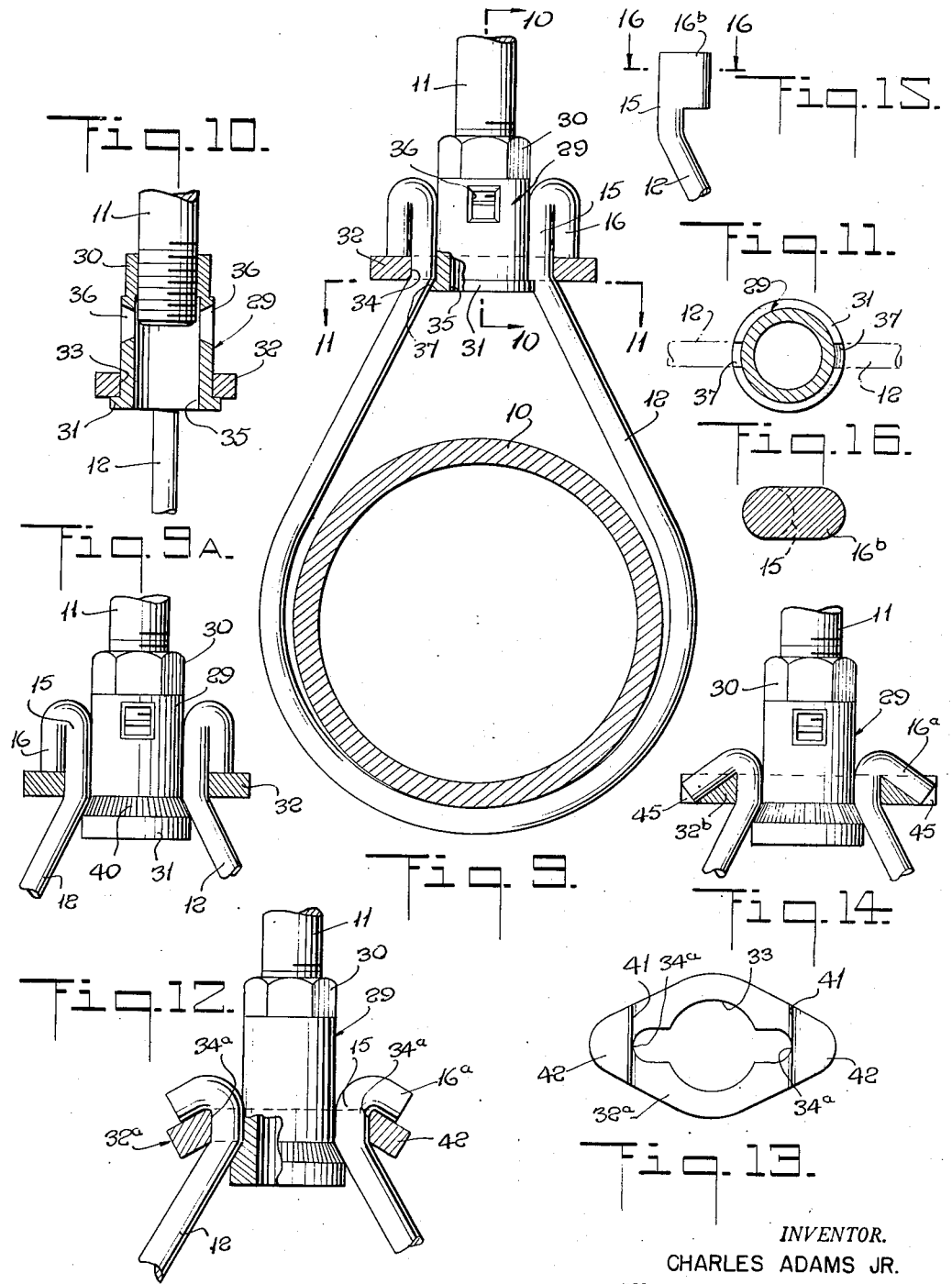

United States Patent Office 2,762,592
Patented Sept. 11, 1956

2,762,592

PIPE HANGER

Charles Adams, Jr., Croton-on-Hudson, N. Y.

Application June 10, 1952, Serial No. 292,669

9 Claims. (Cl. 248—59)

The present invention relates to pipe hangers and an important object of the invention is to provide novel and advantageous adjustable pipe hangers. The present application is in part a continuation of the copending application Ser. No. 255,677, filed November 9, 1951, now abandoned.

Another object of the invention is to provide novel and advantageous adjustable pipe hangers which can readily be assembled.

Yet another object of the invention is to provide pipe hangers of the character specified which are simple in construction, economical to manufacture, and effective in use for the purposes specified.

Still another object of the invention is to provide novel and advantageous pipe holders of the character specified wherein the relatively movable adjustment parts are effectively locked against accidental changes of adjustment while supporting a pipe.

A further object of the invention is to provide novel and advantageous pipe hangers wherein loops or rings for various sizes of pipes may be used without changing the other parts.

A still further object of the invention is to provide a novel and advantageous pipe hanger wherein a pipe supporting loop is supported by means comprising a nut adjustably screwed on the lower threaded end of a fixed vertical rod when the pipe is lifted and locked against accidental movement when the pipe is lowered.

In carrying out the invention, each pipe hanger may comprise a suspension rod anchored at an upper part and having a screw threaded lower end, a pipe-enclosing loop of flexible rod material having at its ends eccentric heads projecting outwardly; a yoke or collar of malleable or forged iron having a central opening receiving said suspension rod, opposite extensions of said central opening to receive the upwardly extending ends of said loop and parts at the outer sides of said extensions to receive and support the outward projections of said heads, and a nut with a preferably hexagonal actuating part and a supporting part to engage the rod ends and underlie said yoke at the sides of said central opening whereby said nut will normally be held against turning. Said nut may be internally threaded adjacent to said actuating part of the nut and said supporting part of the nut may be above or below said actuating part. Lifting of the pipe and loop will enable adjustment of the nut and upon lowering of the pipe and loop, said supporting part of the nut engages the ends of the loop and the yoke around said central opening.

It will be evident that in each yoke the central opening and its extensions must be of such dimensions that the upper ends of the corresponding pipe-embracing loop can be passed therethrough when said ends are pressed toward each other to a required extent. After the loop and yoke have been assembled in this manner, a properly shaped nut may be inserted from below and screwed on a suspension rod while the pipe is lifted. Upon lowering the pipe to render the pipe hanger effective, the nut will be effectively held against turning movement by engagement with the upper ends of said loop.

The upper ends of the loop may take many forms and the yokes may be changed accordingly to cooperate therewith.

Other objects, features and advantages will appear upon consideration of the following detailed description and of the drawings in which:

Fig. 1 is a side elevation of a line of pipe supported at intervals by pipe hangers embodying the present invention, the line of pipe being broken away at intervals to shorten the view.

Fig. 2 is a section taken along the line 2—2 of Fig. 1;

Fig. 3 is a top plan view of a collar or yoke;

Fig. 4 is a perspective view of a nut;

Fig. 5 is a view illustrating a modified form of the upper ends of the pipe-carrying loop;

Fig. 6 is a view similar to Fig. 5 but relates to another embodiment of the invention;

Fig. 7 is a section on line 7—7 of Fig. 6;

Fig. 8 is a bottom plan view of the yoke of Figs. 6 and 7;

Fig. 9 is a view similar to Fig. 6 but illustrating a third embodiment of the invention;

Fig. 9A is a fragmentary view similar to a part of Fig. 9 but showing different means for holding the nut against turning on the suspension rod;

Fig. 10 is a section taken along the line 10—10 of Fig. 9;

Fig. 11 is a section taken along the line 11—11 of Fig. 9;

Fig. 12 is a fragmentary view similar to Fig. 9A but illustrating a fourth embodiment of the invention;

Fig. 13 is a top plan view of the yoke of Fig. 12;

Fig. 14 is a view similar to Fig. 12 but showing a different form of yoke;

Fig. 15 is a fragmentary view in elevation illustrating another form of eccentric upper end for one side of a loop; and Fig. 16 is a section taken along the line 16—16 of Fig. 15.

Referring to Figs. 1 through 4 of the drawings, a pipe 10 is supported by means including vertical suspension rods 11 supported from above in a usual manner and having threaded lower ends to which pipe hanger loops may be adjustably secured. Each pipe hanger comprises a loop 12 which is open at the top and is made of a resilient rod preferably round. Near the ends of each loop 12 in the assembled pipe hanger, opposite parts 15 are substantially in parallelism and the free ends 16 are bent outwardly and downwardly through 180° to fit into sockets or seats 17 in an elongated yoke or collar 18 which may be of malleable or forged iron.

Said yoke 18 has a bottom 19 and at the edge thereof a reinforcing flange or rim 20 which has a downwardly and inwardly inclined inner surface. In the central portion of said bottom 19 there is a round opening 21 of a size to receive freely the corresponding supporting rod 11 while preventing excessive relative rocking. At opposite sides of said opening 21 are extensions 22 thereof to receive the ends of the corresponding loop 12 while leaving material for the bottoms of sockets 17 which support the downturned ends 16 of the sides of the loop 12. The sides of loop 12 diverge downwardly from the parallel portions 15 and the floor edges 23 engaged thereby are inclined accordingly.

The loop 12 may be applied to or removed from a pipe at an end, or by springing the loop it may be applied to pipe 10 from the side or removed therefrom by reversal of such proceeding. After the loop 12 is placed over the pipe 10, the ends may be pressed together and inserted through the yoke 18. When released the ends of the loop will enter the extensions 22 of the central opening 19 and the downturned ends 16 will rest in said seats or sockets 17.

The yoke 18 is then lifted to receive the lower end of the corresponding rod 11 and a suitable nut 24 is screwed on the threaded lower end of the rod. Said nut 24 is preferably a hexagon nut and has its upper part in the form of a cone 25 having an inclination corresponding to that of edges 23 so that it will fit against the rod ends while the latter are in engagement with the edges 23. The nut 24 will also engage the yoke 18 from below.

When the loop 12 is supported by the nut the ends of the loop will extend between corners 26 at the upper edge of the hexagonal part of the nut and the nut will thus be held against turning if the frictional engagement between the ends of said loop and the cone or conical surface 25 is insufficient. It is necessary to lift the pipe and yoke before screwing the nut up or down on the rod, and upon lowering the pipe and yoke for support on the rod 11, the nut will be held in position by friction unless unduly vibrated and if that condition arises it will be held by engagement of the loop ends with the cone. It should be understood that yoke 18 may be formed of malleable iron or forged iron.

A rod of different cross section may be used instead of the round rod 14 and nuts having a different number of sides may be used instead of the hexagon nut 24.

Fig. 5 is a fragmentary sectional view illustrating the use of a loop 12' of which the upper end is formed differently from that of loop 12 of Fig. 2. Instead of downturned ends 16 against straight upright portions 15 (Fig. 2) there are upright portions 16' which are welded thereto at 25'. Otherwise the structure is the same as that shown in Fig. 2.

Another embodiment of the invention is illustrated in Figs. 6, 7 and 8. The pipe 10 is supported by a loop 12' similar to that illustrated in Fig. 5 in that it has rod pieces 16' secured by welds 25' to straight upper end portions 15'. The greatest difference from the structure illustrated is found in the yoke 18' which has parallel upper and lower faces and can be formed by stamping. As shown the yoke 18' is oblong in shape and has a central opening 21' to receive said rod 11 and extensions 22' to receive the sides of the loop 12' near their upper ends, said extensions 22' being expanded at their outer ends and the under side of the yoke to provide surfaces 22'' diverging downwardly from surfaces 22''' perpendicular to the parallel upper and lower faces of yoke 18'. The upper ends of the sides of loop 12' have portions 12'' to engage inclined surfaces 22'' and straight portions 15' to engage surfaces 22''' and extend upwardly beyond the same. Above the yoke 18', metal pieces 16', preferably of a rod of the same diameter as that of the loop 12', are secured to said straight portions 15' as by welds 25'.

The loop 12' and the yoke 18' are assembled in the same manner as loop 12 and yoke 18 of Fig. 2 with parts 16' resting directly on the upper side or top of yoke 18'. The yoke 18' is then lifted to receive the lower end of rod 11 with the latter at the inner sides of parts 15'. Then the nut 24 is screwed on the lower end of rod 11 to bring the surface of cone 25 into engagement with the portions 12'' of the loop ends and force them against inclined surfaces 22'''.

As illustrated in Fig. 6, the pipe 10 and the pipe hanger are in such relative positions that the sides of the loop 12' are bent at points 12''' below the level of the cone 25. The bends are made to suit the size of the pipe and the distance thereof from the cone 25.

Where the actuating part of the nut is below the yoke, the upper part of the nut is shaped to hold the ends of the loop against the outer ends of the yoke and the nut is held against turning by friction or by engagement of the edges of the nut with the ends of the loop. To facilitate the turning of the nut it may be made in the form of a tube with the hexagonal or other turning portion at its upper end and the loop engaging part of the nut at its lower end.

The offset or eccentric heads at the upper ends of the loop ends may be formed in various ways, for example by bending the loop ends outwardly and downwardly through 180° or by using separate pieces of material welded to the outer sides of said ends. With such heads, the yokes may be in the form of flat plates against the upper surfaces of which said heads press, or may be in the form of plates having recessed seats to receive said downturned ends.

In the embodiments of the invention illustrated in Figs. 1 through 8, the nuts 24 on the rods 11 are below the yokes 18 and 18' respectively and between the end portions of the pipe-supporting loops. Such locations render the nuts 24 inaccessible to such extent that it is practically impossible to use an ordinary tool on the nut 24. Furthermore manual operation of the nut is very difficult.

As illustrated in Figs. 9, 10 and 11 the disadvantages due to such inaccessibility of the nut 24, may be avoided by use of a nut 29 in the form of a hollow cylinder with a hexagonal nut head 30 and an outwardly projecting flange 31 at the lower end thereof. The pipe-supporting loop 12 for the pipe 10 is essentially the same as the loop 12 shown in Fig. 2 and has at opposite ends portions 15 designed to be parallel to pipe-supporting rod 11 and end portions 16 turned outwardly and downwardly from portions 15 through 180° and close to portions 15.

Connection between a nut 29 and the ends of a loop 12 may be made by use of a yoke 32 in the form of a flat plate having a central opening 33 to receive the hollow cylindrical boly or barrel of nut 29 but not the flange 31 at the lower end thereof. At opposite sides of said central opening 33 are two extensions 34 thereof to receive the portions 15 of the opposite ends of the loop 12. The opening 33 and the extension 34 are perpendicular to the plane of the yoke 32 and when the hanger is assembled, the lower ends of portions 16 rest on the yoke 32 just beyond the outer ends of the extensions 34.

Assembly of the loop 12, yoke 32 and nut 29 is started by pressing the ends of the loop toward each other and inserting them through the central opening 33 and the extensions 34 by lowering the yoke 32 over said ends. Upon release of the pressure on the sides of the loop, the loop 12 will be spread and be attached to the yoke 32 as shown in Fig. 9. Then the nut 29 is inserted upward through said central opening 33 and between portions 15 of the sides of said loop 12.

The pipe 10 is lifted and the internally threaded hexagonal nut head 30 is screwed on the threaded lower end of supporting rod 11. The nut head 30 is the only part of the nut provided with an internal screw thread and below said nut head 30 the nut 29 is provided with a longitudinal cylindrical bore 35 of greater diameter than rod 11 to permit within the same free relative turning between rod 11 and nut 29. The location of the lower end of rod 11 in nut 29 may be observed through openings 36.

To hold the nut 29 against accidental turning from adjusted position, the flange 31 may be provided with two diametrically opposite notches 37 with inclined bottoms (Figs. 9 and 11) which tend to press portions 16 of the sides of the loop against the outer ends of extensions 34. In the final adjustment of nut 29 to hold the pipe at a desired height, the nut is brought into position so that lowering of pipe 12 will cause the lower ends of portions 15 of a loop 12 to enter said notches 37 and be cammed by said inclined bottoms into engagement with the outer ends of said extensions 34. It should be understood that additional pairs of locking notches 37 may be provided.

While the notches 37 in cooperation with the ends of loop 12 provide a very effective lock, they do not provide for any adjustments of nut 29 through less than 180°. Of course finer adjustments can be arranged for by increasing the number of pairs of notches 37 but it would not take many pairs of notches to fill all available space on flange 31. A fine degree of adjustment may be obtained by chamfering or tapering the upper part of flange 31 to provide a tapered or conical surface 40 (Fig. 9A) which is then milled to provide a good frictional surface for engagement by the upper ends of loop 12.

In bending the ends of a loop 12 outwardly and downwardly through an angle of 180°, there is danger of weakening the metal at the bend during the bending operation unless such operation is performed with great care and under suitable conditions. Furthermore there is heavy leverage exerted on the bend to straighten the same, as will be evident upon consideration of Fig. 9. The pull through a part 15 of one end of a loop 12 is exerted along the axis of part 15 and the power arm of the leverage would extend to a line parallel to said axis and at the outer side of said rod end portion 16.

To avoid the different disadvantages just mentioned, the degree of original bending of the loop ends is reduced and the form of the yoke is changed. As illustrated in Fig. 12, the end portions 16 are turned outwardly and downwardly through an angle of much less than 180°, preferably 120°. With this form of the ends there is much less strain in the metal and much less danger of weakening the material at the bend.

The change in the loop ends requires a change in the form of yoke for use therewith. According to this form of pipe hanger the blank for the yoke 32a is bent down along lines 41 (Fig. 13) at the ends to provide downturned end portions 42 corresponding to the angle of the ends 16 of the loop. Then the central opening 33 and the end openings 34a are stamped out with their walls perpendicular to the central portion of the yoke and providing edges or angles of approximately 60° at the top edge at the outer side of said end openings or extensions 34a. With this arrangement, the leverage tending to straighten the upper ends of loop 12 is produced by a leverage arm extending from the axis of a part 15 to a line parallel to said axis and passing through the edge of the corresponding extension 34a. With this form there is much less leverage to straighten the corresponding end of a loop 12 and there is very much less danger of weakness at the bend, than in the arrangement of Fig. 9.

The arrangement in Fig. 14 is similar to that of Fig. 12 except that the downturned ends 16a are supported by a yoke 32b having outwardly and downwardly inclined grooves 45 to receive said ends 16a.

It will be evident that in all forms thus far disclosed, the heads at the upper ends of the opposite sides of a loop 12 are offset or eccentric with respect to the axes of the upright parts 15, in that each head includes a corresponding upright portion 15 and a projecting portion 16, 16' or 16a (Figs. 2, 5 and 9) projecting outwardly and downwardly from the upper end of portion 15.

Obviously the heads of the forms disclosed in Figs. 1 through 9 would be much stronger if the two parts 15 and 16 or 15 and 16' were integral with each other. However, it would not be practicable to make the heads integral unless such heads are formed during the making of the loops. Figs. 15 and 16 illustrate an end of a loop 12, which end comprises an integral head including the upper end 15 of the corresponding side of loop 12 and an outward projection 16b integral therewith. In this form of head, the section is in the general form of an oval or ellipse.

In all of the forms of pipe hangers illustrated in Figs. 9 through 14 the lower end of each nut may obviously be formed like the nut of Fig. 1 with a conical surface to engage the sides of a pipe-supporting loop and a lower nut portion of hexagonal or other form, whose edges are effective to prevent accidental loosening of the nut.

It should be understood that various changes may be made and that certain features may be made without departing from the true scope and spirit of the invention.

What is claimed is:

1. A pipe hanger comprising an upright suspension rod fixed at an upper part and having a screw-threaded lower end; a yoke having a central opening receiving said suspension rod and also opposite extensions of said central opening having parallel axes; an open pipe-supporting loop of resilient material, the ends of said loop engaging the ends of said extensions and including upwardly-extending parallel parts fitting in said extensions and having outward projections resting on said yoke; and a nut on said rod having a part by which it may be turned, a cylindrical part engaging the parallel parts of said loop and holding them in said extensions and a yoke-supporting part having an inclined surface engaging the ends of said loop below said parallel parts and clamping them against the ends of said extensions.

2. A pipe hanger according to claim 1 wherein said outward projections comprise portions of the loop ends downturned from the upper ends of said parallel parts.

3. A pipe hanger according to claim 1 wherein said inclined surface is a conical upper surface with milling to cooperate with the loop ends.

4. A pipe hanger according to claim 1 wherein said part of said nut by which it is operated is above said yoke-supporting part and above said loop.

5. A pipe hanger according to claim 1 wherein the nut comprises a tubular body, a nut-operating head at its top having an internal screw thread to cooperate with the threaded end of the suspension rod, and a flange with a milled conical top to cooperate with the sides of said loop to hold the nut against turning, said nut-operating head being small enough to pass through said opening and said flange being too large to pass through said opening.

6. A pipe hanger comprising an upright suspension rod fixed at an upper part and having a screw-threaded lower end; a yoke having a central opening receiving said suspension rod and also opposite extensions of said central opening, said yoke having its ends downturned at the outer edges of said extensions to provide upwardly facing edges; an open pipe-supporting loop of resilient material, the ends of said loop engaging the ends of said extensions and including upwardly-extending parallel parts having downturned extensions projecting over said edges and downwardly along the faces of said downturned ends of the yoke; and a nut on said rod having a yoke-supporting part with a conical portion engaging said loop and clamping the loop against the ends of said extensions, and a portion having the outline of a regular polygon.

7. A pipe hanger comprising an upright suspension rod fixed at an upper part and having a screw-threaded lower end; a yoke having a central opening receiving said suspension rod and also opposite extensions of said central opening, said yoke having its end downturned at the outer edges of said extensions to provide upwardly facing edges; an open pipe-supporting loop of resilient material, the ends of said loop engaging the ends of said extensions and including upwardly-extending parallel parts having downturned extensions projecting over said edges and downwardly along the faces of said downturned ends of the yoke; and a nut on said rod having a yoke-supporting flange with a conical portion engaging said loop and clamping the loop against the ends of said extensions and a portion having the outline of a regular polygon, a hollow body carrying said flange and extending upwardly between said loop ends, and an operating head having the outline of a regular polygon.

8. A pipe hanger comprising an upright suspension rod fixed at an upper part and having a screw-threaded lower end; a yoke having a central opening receiving said suspension rod and also opposite extensions of said central opening, said yoke having in its ends grooves inclined downwardly and outwardly from the upper edges of said extensions to provide upwardly facing edges, an open pipe-supporting loop of resilient material, the ends of said loop engaging the ends of said extensions and including upwardly-extending parallel parts having downturned extensions projecting over said edges and downwardly along said grooves; and a nut on said rod having a yoke-supporting flange with a conical portion engaging said loop and clamping the loop against the ends of said extensions, and a portion having the outline of a regular polygon.

9. A pipe hanger comprising an upright suspension rod fixed at an upper part and having a screw-threaded lower end; a yoke having a central opening receiving said suspension rod and also opposite extensions of said central opening, said yoke having in its ends grooves inclined downwardly and outwardly from the upper edges of said extensions to provide upwardly facing edges, an open pipe-supporting loop of resilient material, the ends of said loop engaging the ends of said extensions and including upwardly-extending parallel parts having downturned extensions projecting over said edges and downwardly along said grooves and a nut on said rod having a yoke-supporting flange with a conical portion engaging said loop and clamping the loop against the ends of said extensions and a portion having the outline of a regular polygon, a hollow body carrying said flange and extending upwardly between said loop ends, and an operating head having the outline of a regular polygon.

References Cited in the file of this patent

UNITED STATES PATENTS

| Number | Name | Date |
|---|---|---|
| 176,871 | Loring | May 2, 1876 |
| 566,690 | Kling | Aug. 25, 1896 |
| 652,617 | Hotz | June 26, 1900 |
| 702,704 | Carll | June 17, 1902 |
| 709,815 | Collins | Sept. 23, 1902 |
| 1,017,975 | Kenway | Feb. 20, 1912 |
| 1,579,419 | Tomkinson | Apr. 6, 1926 |
| 1,699,381 | Stewart | Jan. 15, 1929 |
| 1,850,275 | Zifferer | Mar. 22, 1932 |
| 1,904,315 | Kenway | Apr. 18, 1933 |
| 1,924,353 | Fitzpatrick | Aug. 29, 1933 |
| 2,551,803 | Leonard | May 8, 1951 |